Jan. 17, 1939.　　　　　M. F. OHMAN　　　　　2,144,119
RECOVERY OF IODINE FROM CHARCOAL
Filed Dec. 17, 1936
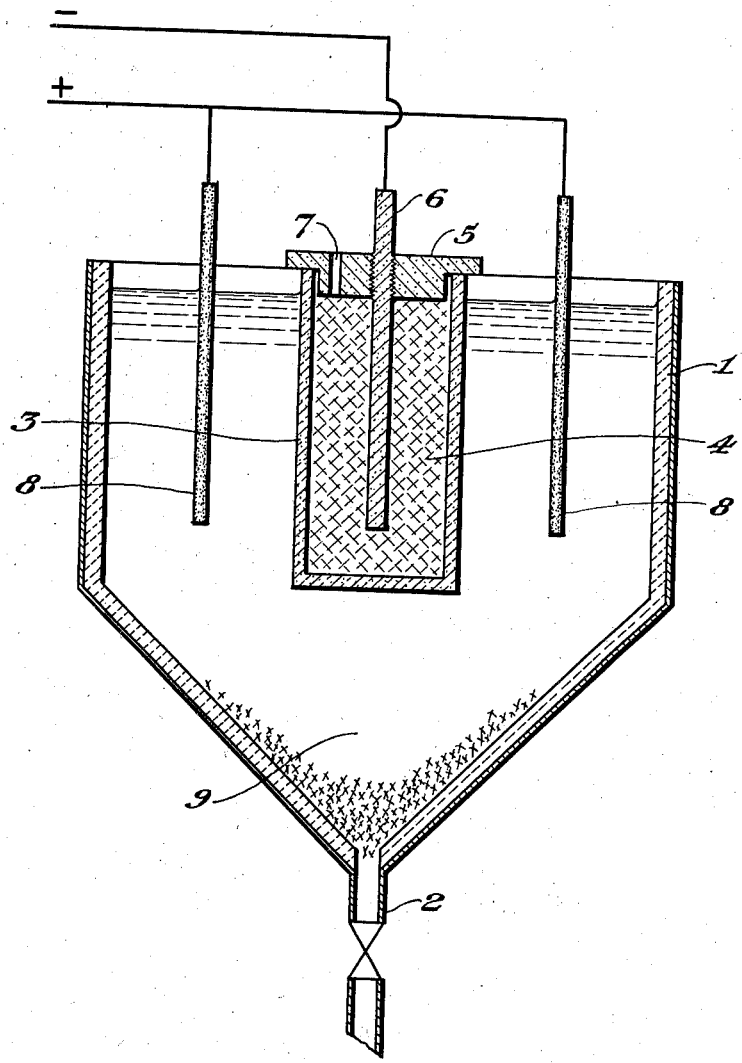
INVENTOR
Maurel F. Ohman
BY
Griswold & Burdick
ATTORNEYS Patented Jan. 17, 1939

2,144,119

UNITED STATES PATENT OFFICE 2,144,119

RECOVERY OF IODINE FROM CHARCOAL

Maurel F. Ohman, Long Beach, Calif., assignor to The Dow Chemical Company, Midland, Mich., a corporation of Michigan Application December 17, 1936, Serial No. 116,376

5 Claims. (Cl. 204—9)

The invention relates to methods for extracting iodine from natural brines, bitterns and the like. One well-known method of this general character consists in liberating the iodine in the brine by treatment with an oxidizing agent, such as chlorine, and then contacting the treated brine with a body of an adsorbent agent, such as active charcoal, the charcoal removing the iodine from the brine by adsorption. It is then necessary to recover the adsorbed iodine from the charcoal, and with this stage of the general process the present invention is more particularly concerned.

Numerous proposals have been made heretofore for separating and recovering iodine from active charcoal. Such methods involve heating the charcoal to volatilize the iodine, or extracting with a solution of an agent capable of converting the iodine to a soluble compound which can be leached out with water, or extracting with an organic solvent for the iodine. All such methods fail to give a sufficiently high degree of recovery of the iodine from the charcoal to be economical in a commercial process. For example, the various methods of heating the charcoal to vaporize the iodine give a very imperfect recovery, not more than about 90 per cent, and often much less, while the condensation and recovery of the iodine vapors may also give rise to losses. Furthermore, charcoal which has been subjected to such heating has been found to be less effective to adsorb more iodine than was the original charcoal. The best of the extraction methods likewise fail to give a recovery of more than about 90 per cent of the iodine contained in the charcoal, the leaching out of iodine salts requires repeated washings, and the solutions obtained contain other compounds than those of iodine, from which the iodine compound must be separated by further purification. In addition, the charcoal after leaching is materially reduced in activity and, when reused, is inferior to fresh charcoal.

I have now found that adsorbed iodine can be recovered from active charcoal in higher yield and more economically by an appropriate electrolytic treatment. The iodine-charged charcoal is made the cathode in an electrolytic cell using an aqueous electrolyte, the anode being a rod, block or plate of carbon or other conducting material not attacked by iodine. The iodine in the charcoal is reduced to hydriodic acid, which dissolves in the electrolyte, and is again oxidized at the anode and precipitated, settling to the bottom of the cell in a form easily removed. I have found that a higher extraction of iodine from the charcoal can be attained in this way than by the known methods mentioned above. The iodine is obtained directly in solid crystalline form and highly pure. I have further found that the charcoal, after removal of iodine in this manner, retains its original activity to adsorb iodine and, in fact, may have an increased effectiveness for the purpose. The invention, then, consists in the method of recovering iodine from active carbon or charcoal hereinafter fully described and particularly pointed out in the claims, the annexed drawing and following description setting forth various ways in which the principle of the invention may be applied.

In said annexed drawing:

The single figure shows diagrammatically a form of apparatus suitable for carrying out the method of the invention.

In carrying out the invention an iodiferous brine or the like, containing for example 50 to 100 parts per million of iodine, is oxidized in the usual way to liberate the iodine in the elemental state. As an oxidizing agent chlorine is usually preferred, although the treatment can be made with other known oxidizing agents, such as nitrous acid, potassium permanganate, etc., or by electrolysis. Prior to oxidation the brine is acidified, if necessary, preferably to a pH value between about 2 and 4. The oxidized brine containing free iodine is then intimately contacted with active carbon or charcoal for a period of time, whereby the charcoal removes the iodine from the brine by adsorption, according to known practice. The iodine-charged charcoal is then separated from the brine by filtration, decantation, or otherwise, and the wet charcoal is transferred to an electrolytic cell. The charcoal is compressed into a mass contained within a porous cup or receptacle in the cell and connected to the negative pole of a source of direct electric current, the body of charcoal thus forming the cathode. Anodes of suitable material unattacked by iodine, such as carbon, are provided in the cell, and the latter filled with water to which is added a small amount of an electrolyte, such as hydriodic acid, hydrochloric acid, sulphuric acid, sodium chloride, etc., to insure a sufficient conductivity. A direct electric current is then passed through the cell, which reduces the iodine at the cathode to hydriodic acid. The latter, being readily soluble, dissolves in the electrolyte and is ionized by the current, hydrogen being liberated at the cathode and iodine at the anode, where it is precipitated in non-adherent crystalline form and settles to the bottom of the cell. When the iodine has been precipitated, the electrolyte and iodine are removed from the cell and separated by filtration or the like. The electrolyte can be returned to the cell for reuse. The separated iodine is highly pure, but can be treated in any suitable manner to remove any traces of impurities, for example by melting under sulphuric acid, as described in United States Patent No. 1,857,632.

For the electrolysis a suitable voltage is 5 to 6 volts. The current can be varied within wide limits, depending upon the electrode area in the cell, being adjusted to a current density such that no material heating of the electrolyte occurs. A current density of from 10 to 20 amperes per square foot at the active anode surface has been found satisfactory, the density being calculated from the area of the outer surface of the compressed mass of charcoal.

A form of construction for a suitable cell is shown in the drawing. A tank 1 made of, or lined with, non-conducting material, such as stoneware or acid-proof cement, serves as a container for the electrolyte. Tank 1 is conveniently provided with a conical or tapered bottom to collect the iodine deposited during the electrolysis. A valved outlet 2 is located at the bottom of tank 1 for removing its contents. A cup or receptacle 3 of porous non-conducting material is centrally disposed in tank 1, suitable material being porous stoneware, unglazed porcelain, or the like. A body of iodine-charged charcoal 4 is compressed within receptacle 3 so as to fill the same, and is covered over at the top by a cover 5 of carbon or other conducting material, which presses down upon the body of charcoal 4 and holds it in place. One or more rods 6 of conducting material, preferably carbon, are embedded in the body of charcoal 4, projecting upwardly through openings in cover 5 and being connected to the negative pole of a source of direct electric current. Rods 6 are preferably threaded and screwed through tapped holes in cover 5 to make good electrical contact between rod and cover, so that the current is transmitted to the body of charcoal 4 by means both of cover 5 and rods 6. A gas vent 7 is also provided in cover 5. One or more anodes 8, connected to the positive side of the electrical source, are disposed about receptacle 3. With the cell thus assembled, tank 1 is filled with an aqueous electrolyte 9 to a level approximately as shown, such electrolyte passing through the porous walls of receptacle 3, which is immersed therein, and permeating the body of charcoal 4. When the current is passed, hydrogen is evolved at and within the body of charcoal forming the cathode 4, being vented through the opening in cover 5, while iodine is deposited at anodes 8 and collects as a mass of crystals in the bottom of tank 1.

Since the electrolyte saturates the charcoal throughout the mass, electrolysis takes place simultaneously at all parts of the mass as well as within the pores of the individual grains of charcoal. This effects a more complete removal of the iodine than is possible with any extraction or heating method. Not only can the iodine be completely dissolved out of the charcoal, but it also can be quantitatively separated from the electrolyte in the most direct and economical manner by deposition at the anode in a loose, non-adherent crystalline form, and substantially pure.

In the practice of the invention I have found that electrolyzed charcoal may be completely freed from iodine at a current efficiency in excess of 80 per cent, using fine granular activated charcoal of 100 to 300 mesh size. Granular charcoal of such size is used that sufficient voids are left in the compressed mass of charcoal in the cathode chamber to permit of ready escape of hydrogen gas, which is evolved during the electrolysis. The active charcoal from which iodine has been removed by the present electrolytic method can be reused to adsorb further amounts of iodine without loss of adsorption efficiency, and, in fact, with a slightly improved efficiency. On the other hand, active charcoal from which iodine has been removed by heating or by extraction with chemical solvents suffers a marked loss of activity, as much as 30 per cent or more, and when reused is much less efficient than fresh charcoal. Accordingly, it is one of the advantages of the method of the invention that the active charcoal can be used repeatedly without loss of efficiency for adsorbing iodine from solutions containing the same, whereas, with other methods for recovering iodine from the charcoal, the latter is rendered considerably less effective for reuse.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method for separating iodine from active carbon or charcoal on which it is adsorbed, the steps which consist in subjecting such iodine-charged carbon to direct current electrolysis in an aqueous acidic medium in a cell in which such carbon constitutes the cathode and the anode is formed of a conducting material not attacked by iodine, whereby iodine is precipitated at the anode in non-adherent form, and permitting such iodine to settle by gravity away from the vicinity of the anode.

2. In an iodine recovery process, wherein iodine is liberated in an iodiferous brine and removed therefrom by adsorption upon active carbon or charcoal, the method of recovering the adsorbed iodine from the carbon which comprises compressing such iodine-charged carbon into a porous-walled receptacle which is immersed in an aqueous acidic medium in an electrolytic cell in which such compressed body of carbon constitutes the cathode and the anode is formed of a conducting material not attacked by iodine, passing a direct electric current through such aqueous medium, whereby iodine is reduced and dissolved at the cathode and deposited at the anode in non-adherent form, and permitting such iodine to settle by gravity away from the vicinity of the anode.

3. The method according to claim 2 in which a carbon anode is employed.

4. The method according to claim 2 in which the voltage is on the order of about 5 to 6 volts and the current density is regulated at a point such as to avoid material heating of the aqueous medium.

5. The method according to claim 2 in which the current density is on the order of 10 to 20 amperes per square foot calculated on the outside area of the compressed mass of carbon.

MAUREL F. OHMAN.